United States Patent
Ye et al.

(10) Patent No.: US 7,752,150 B2
(45) Date of Patent: Jul. 6, 2010

(54) DYNAMIC ECONOMIC LOAD DISPATCH BY APPLYING DYNAMIC PROGRAMMING TO A GENETIC ALGORITHM

(75) Inventors: Chen Zhou Ye, Shanghai (CN); Xunwei Xiang, Shanghai (CN); Dan Qing Zhang, Shanghai (CN); JinWei He, ShangHai (CN)

(73) Assignee: Honeywell International Inc., Morristown, NJ (US)

( * ) Notice: Subject to any disclaimer, the term of this patent is extended or adjusted under 35 U.S.C. 154(b) by 436 days.

(21) Appl. No.: 11/637,406

(22) Filed: Dec. 12, 2006

(65) Prior Publication Data
US 2008/0154810 A1 Jun. 26, 2008

(30) Foreign Application Priority Data
Sep. 29, 2006 (CN) .......................... 2006 1 0140672

(51) Int. Cl.
*G06N 3/00* (2006.01)
(52) U.S. Cl. ........................... 706/13; 700/286; 700/295
(58) Field of Classification Search .................... 706/13; 700/286, 295
See application file for complete search history.

(56) References Cited

U.S. PATENT DOCUMENTS

| | | | | |
|---|---|---|---|---|
| 6,745,109 | B2 * | 6/2004 | Kojima et al. ............... | 700/291 |
| 2004/0257059 | A1 * | 12/2004 | Mansingh et al. ........ | 324/76.11 |
| 2006/0085363 | A1 * | 4/2006 | Cheng et al. ................ | 705/400 |

OTHER PUBLICATIONS

"Genetic algorithm solution of economic dispatch with valve poin tloading", D. C. Walters, G. B. Sheble, IEEE Transactions on Power Systems, vol. 8, No. 3, Aug. 1993, pp. 1325-1332.*

"A Modified Mutation Operator and Mathematical Analysis of Its Efficiency", W. Minle et al, Proceedings of the 3$^{rd}$ World Congress on Intelligent Control and Automation, Jun. 28-Jul. 2, 2000, China, pp. 1-11.*

"Multiple vehicle routing with time windows using genetic algorithms", S. J. Louis, X. Yin, Z. Y. Yuan, Evolutionary Computation, 1999, CEC 99, Proceedings of the 1999 Congress on, vol. 3, pp. 1804-1808.*

"Incorporating generator reactive power limits into constrained-genetic-algorithm load flow", K. P. Wong, A. Li, M. Y. Law, Advances in Power System Control, Operation and Management, 1997, APSCOM 97, 4th International Conference on, vol. 1, Nov. 11-14, 1997, pp. 298-303.*

"Guillotineable bin packing: A genetic approach", Berthold Kroger, European Journal of Operational Research, 1995, pp. 645-661.*

(Continued)

*Primary Examiner*—David R Vincent
*Assistant Examiner*—Mai T Tran
(74) *Attorney, Agent, or Firm*—Schwegman, Lundberg & Woessner PA

(57) ABSTRACT

In an embodiment, a system and method provide a constraint on a genetic algorithm, and further provide dynamic programming capability to the genetic algorithm. The system and method then allocate load demand over a finite number of time intervals among a number of power generating units as a function of the constraint on the genetic algorithm and the dynamic programming capability of the genetic algorithm.

16 Claims, 6 Drawing Sheets

OTHER PUBLICATIONS

Aruldoss, T., et al., "A modified hybrid EP-SQP approach for dynamic dispatch with valve-point effect", *International Journal of Electrical Power & Energy Systems*, 27(8), (Oct. 2005),594-601.

Attaviriyanupap, P., et al., "A hybrid EP and SQP for dynamic economic dispatch with nonsmooth fuel cost function", *IEEE Transactions on Power Systems*, 17(2), (May 2002),411-416.

Gaing, Zwe-Lee, "Particle swarm optimization to solving the economic dispatch considering the generator constraints", *IEEE Transactions on Power Systems*, 18(3), (Aug. 2003),1187-1195.

Han, X. S., et al., "Dynamic economic dispatch: feasible and optimal solutions", *IEEE Transactions on Power Systems*, 16(1), (Feb. 2001),22-28.

Jabr, R. A., et al., "A study of the homogeneous algorithm for dynamic economic dispatch with network constraints and transmission losses", *IEEE Transactions on Power Systems*, 15(2), (May 2000),605-611.

Li, F., et al., "Fast and accurate power dispatch using a relaxed genetic algorithm and a local gradient technique", *Expert Systems with Applications*, 19(3), (Oct. 2000),159-165.

Li, F., et al., "Hybrid genetic approaches to ramping rate constrained dynamic economic dispatch", *Electric Power Systems Research*, 43(2), (Nov. 1997),97-103.

Lin, Whei-Min, et al., "An improved tabu search for economic dispatch with multiple minima", *IEEE Transactions on Power Systems*, 17(1), (Feb. 2002),108-112.

Lin, Whei-Min, et al., "Nonconvex economic dispatch by integrated artificial intelligence", *IEEE Transactions on Power Systems*, 16(2), (May 2001),307-311.

Ouiddir, R., et al., "Economic Dispatch using a Genetic Algorithm: Application to Western Algeria's Electrical Power Network", *Journal of Information Science and Engineering*, 21, (2005),659-668.

Su, Ching-Tzong, et al., "New approach with a Hopfield modeling framework to economic dispatch", *IEEE Transactions on Power Systems*, 15(2), (May 2000),541-545.

Youssef, H. K., et al., "Genetic based algorithm for security constrained power system economic dispatch", *Electric Power Systems Research*, 53(1), (Jan. 5, 2000),47-51.

\* cited by examiner $$(d^1_{k1}, d^1_{k2}, ..., d^1_{kN}), ..., \underbrace{(d^t_{k1}, d^t_{k2}, ..., d^t_{kN})}_{\text{TIME INTERVAL } t}, ..., (d^T_{k1}, d^T_{k2}, ..., d^T_{kN})$$

DYNAMIC ECONOMIC LOAD DISPATCH BY APPLYING DYNAMIC PROGRAMMING TO A GENETIC ALGORITHM

RELATED APPLICATIONS

This application claims priority under 35 U.S.C. §119 to Chinese Patent Application No. 200610140672.8, Filed Sep. 29, 2006, which application is incorporated herein by reference.

TECHNICAL FIELD

Various embodiments relate to power generating units, and in an embodiment, but not by way of limitation, a system and method for allocating output among a plurality of power generating units.

BACKGROUND

An Economic Load Dispatch (ELD) algorithm seeks to allocate power output among several generating units to match customer load demand at the minimum cost. The ELD is a fundamental optimization issue to improve the operating efficiency of a power plant, especially when the load demand curve of a generating company is determined by the net sum of a set of transactions. When the dispatch problem concerns a single time interval, it is referred to as a static economic load dispatch (SELD). When the dispatch problem concerns a finite number of dispatch intervals coupled with load forecasting to provide an optimal generation trajectory tracking a varying load demand, it is referred to as a dynamic economic load dispatch (DELD) problem. Comparing the two, DELD affords a more economic solution over all generators and all time intervals. However, DELD has long been recognized as a difficult dynamic programming problem due to the dynamic nature of a power system and the large variations in customer load demand. The dynamic problem is normally solved by dividing the entire dispatch period into a number of small time intervals, over which the load is considered constant and the system is considered to be in a temporal steady state. To achieve the overall cost reduction in operating a power system, the individual static intervals should be dispatched economically subject to the static constraints at that time and the additional limits put on by a series of time dependent dynamic constraints. Due to these constraints, the search space for optimization is narrow and uneven, and therefore challenges any algorithm that tries to find the optimal dispatch solution quickly and accurately.

Although several methods such as neural networks and evolutionary programming have been used to solve the SELD problem, only quadratic programming and evolutionary computing approaches have been used to solve the DELD problem. Except for the evolutionary methods, all these numerical methods make the assumption that the fuel cost function of every unit is monotonically increasing and can be expressed either by a piecewise linear equation or a quadratic equation. Unfortunately, this is not the case in real world practical systems due to non-linear characteristics including a non-smooth and non-convex fuel cost function, ramp rate limits, and discontinuous prohibited operating zones.

Even evolutionary methods have problems when solving a DELD problem. For example, in order to satisfy the many static and dynamic constraints, evolutionary methods assign a very low fitness, and therefore a very low survival chance, to the individual corresponding to a constraint violating solution, or directly rule that individual out of the population. This kind of penalty heavily restricts the sharing of information between individuals and generations. Consequently, a high percentage of individuals will be eliminated before they can contribute to the evolution. This makes the algorithm inefficient.

SUMMARY

Figure 1:
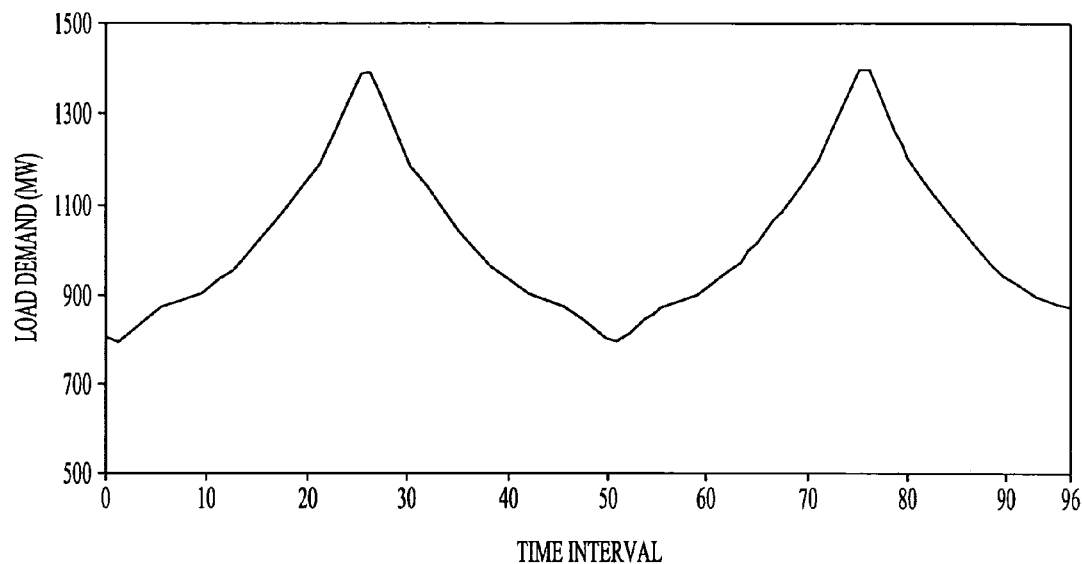
FIG. 1 illustrates an example of a load demand curve.

In an embodiment, a system and method provide a constraint on a genetic algorithm, and further provide dynamic programming capability to the genetic algorithm. The system and method then allocate load demand over a finite number of time intervals among a number of power generating units as a function of the constraint on the genetic algorithm and the dynamic programming capability of the genetic algorithm.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

A number of figures show block diagrams of systems and apparatus of embodiments of the invention. A number of figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In an embodiment, a constrained genetic algorithm (CGA) makes a dynamic economic load dispatch (DELD) feasible when the fuel cost function is neither smooth nor convex and when there are four types of constraints. A first constraint is that the load demand and the sum of all generator outputs are equal. A second constraint is that each generating unit has an upper and lower output limit. A third constraint is a limit on the ramp up and ramp down rates of the generating units. A fourth and final constraint involves prohibited operating zones of the generating units. The inventors have discovered that a reason that a traditional genetic algorithm fails to solve the DELD problem is that its genetic operators affect the given individuals in a bit by bit manner and cannot coordinate the changes to all the bits involved in some dynamic relations. Traditional genetic algorithms fail to solve the DELD problem because the genetic operators such as initialization, crossover, and mutation are inherently incapable of handling dynamic constraints. They affect the given individuals or solutions in an interval by interval manner without caring about the intervals that occur prior to and after the concerned interval, and can not coordinate the changes that happen to all the time intervals necessarily involved in some dynamic relations. The CGA solves the problem through the following modifications. First, the heavily constrained initialization, crossover, and mutation operators keep all evolving individuals (or solutions) within or close to the feasible regions. Second, a biased and heuristic initialization assures a truly diversified initial population. Third, the choice of feasible positions for crossover accommodates dynamic constraints. Fourth, positive and negative mutation operators save fuel cost and achieve load equality.

The CGA can solve all four of these constraints by itself without involving an additional optimization method such as quadratic programming. The CGA is flexible and can be modified to accommodate more constraints such as scheduled online/offline status of a generator, varied minimum and maximum output of a generator, and varied ramp up and ramp down rates of a generator. Furthermore, the CGA can be run in a parallel mode to further speed up the optimization process.

The present disclosure provides for a CGA to solve the problem of DELD for power generating units such as electricity generating power plants. The CGA determines an optimum schedule of generator outputs so as to meet the load demand at the minimum operating cost, and further to satisfy various constraints imposed by the system and operating conditions. The initialization, crossover, and mutation steps of the CGA are heavily constrained so as to keep all evolving individuals within or close to the feasible regions. This makes DELD feasible when the fuel cost function of each generating unit is neither smooth nor convex, and there are one or more of the following constraints—the load demand and the sum of the generator outputs must be equal, there are upper and lower limits for each generating unit, there are certain limits to the ramp up and ramp down rates, and there are prohibited operating zones.

For example, if the 24-hour load demand (an example of which is illustrated in FIG. 1) has been divided into T (for example T=96) pieces of equivalent time intervals $\Delta t$ (each interval equaling 15 minutes), and there are N generating units, then given the ith (i=1,2, . . . ,N) generating unit and its minimum and maximum output, the ramp down and the ramp up rates of that ith generating unit are $P_{i.min}$, $P_{i.max}$, $DR_i$, $UR_i$ respectively. The unit will have $Z_i$ nonoverlapping prohibited operating zones (POZs) ($z_{il}$=($P_{min\_il}$, $P_{max\_il}$) (l=1,2, . . . , $Z_i$, $P_{min\_il}$, $P_{max\_il}$ stand for the minimum and maximum outputs of the lth POZ)}; $P_i^t$ (t=1,2, . . . ,T) stands for its output at interval t, and $P_i^0$ is its initial output; and $C_i(P_i^t)$ stands for the fuel consumption rate when its output power is $P_i^t$. If $D^t$ stands for the load demand at interval t, then $C_T$ denotes the fuel cost of N generating units during all the T intervals. The dynamic load economic dispatch problem can then be formulated as:

Minimize $$C_T = \sum_{t=1}^{T} \sum_{i \in N} C_i(P_i^t) \quad (1)$$

Subject to:

a) Load equality constraint:

$$\sum_{i \in N} P_i^t = D^t$$

b) Upper and lower limits of power output:

$P_{i.min} \leq P_i^t \leq P_{i.max}$ c) Ramp up/down limit:

$-DR_i \Delta t \leq P_i^t - P_i^{t-1} \leq UR_i \Delta t (t=1, 2, \ldots, T; i=1, 2, \ldots, N)$ d) Prohibited operating zones:

$P_i^t \notin z_{il} (l=1,2, \ldots, Z_i)$

Since it is highly possible that a generating unit can not entirely get across a POZ within one time interval ($\Delta t$) due to the limit of the ramp up/down rates, it is permitted that the dispatched load is in a POZ provided that the total number of time intervals that any of the units working in the POZ be minimized. Thus, the constraint (d) can be modified to:

e) Prohibited operating zones in a weaker form:

$$\text{Minimize } T_{POZ}=\|\{P_i^t|P_i^t\in z_{il}(t=1,2,\ldots,T; i=1, 2,\ldots,N; l=1,2,\ldots,Z_i)\}\|$$

In this constraint, $T_{POZ}$ is the total number of time intervals for any of the generators working in the POZ, and $\|\cdot\|$ calculates the cardinality (number of members) of a given set.

Figures 3, 4:
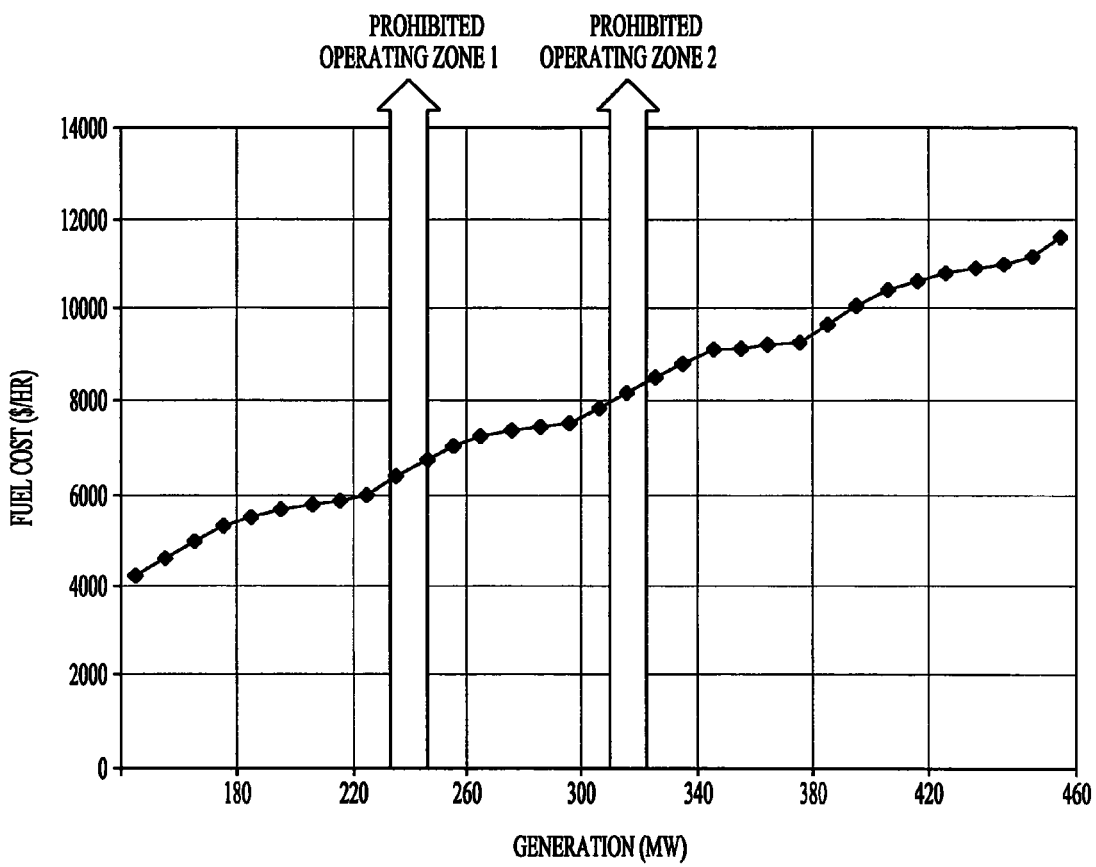
FIG. 3 illustrates an example of a fuel cost function including prohibited operating zones.
FIG. 4. illustrates a representation of a makeup of an individual for a genetic algorithm.

The limitations of quadratic programming (QP) in solving the problem of DELD make genetic algorithms (GA) an attractive alternative. One reason for this is that GAs can use a fuel cost function of any form (an example of which is illustrated in FIG. 3), can consider various constraints, requires no starting point for optimization, have a higher chance to escape from local minima, can be run in a parallel mode, and possibly have shorter running times. However, as mentioned earlier, original GAs fail to solve the DELD problem without the help of QP, and QP has its own limitations. The inventors have discovered that the root reason of the failures is that the genetic operators such as initialization, crossover, and mutation are inherently incapable of handling dynamic constraints. They affect the given individual(s) or solution(s) in an interval-by-interval manner without addressing the intervals prior to and after the interval being considered. Consequently, there is no coordination among all the changes happening to all the time intervals necessarily involved in some dynamic relations. Motivated by this finding, the inventors designed a constrained genetic algorithm (CGA) by making key modifications to the original GA.

Figure 2:
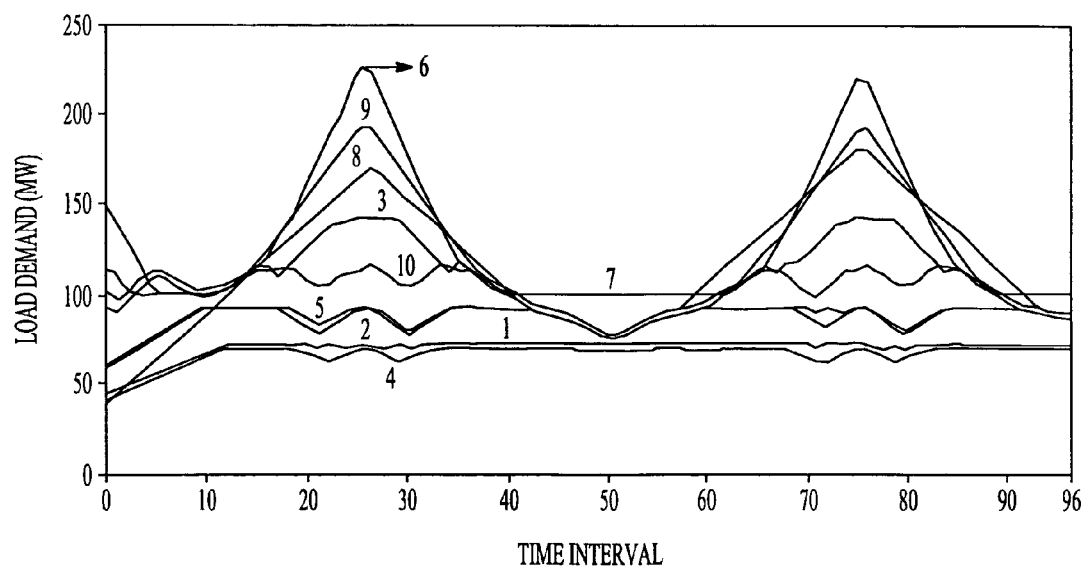
FIG. 2 illustrates an example of ten load dispatch curves for ten different generators.

For example, if a CGA has a population of size L, every individual "living" in the population stands for a specific solution of load dispatch. A graphical example of a solution of a load dispatch is illustrated in FIG. 2. FIG. 4 illustrates constitution of the kth (k=1,2, . . . ,L) individual, and in FIG. 4 $d_{ki}^t$ stands for the load allocated for the ith generating unit at time interval t.

The fitness of the kth individual is evaluated in the following way:

$$\text{fitness}(k) = \frac{(f_{\max} + \Delta) - f_{cost}(k)}{(f_{\max} + \Delta) - (f_{\min} - \Delta)} (\Delta > 0) \quad (2)$$

Here $f_{cost}(k)$ denotes the overall fuel cost of the solution, $f_{min}=\min(f_{cost}(j))$, and $f_{max}=\max(f_{cost}(j))$, $\forall j=1,2, \ldots L$. The expression $\Delta>0$ guarantees the fitness of every individual within (0, 1) so that every individual has a non-zero chance to be selected in evolution. The overall fuel cost is then calculated as follows:

$$f_{\text{itv\_cost}}(k, t) = \sum_{i\in N} C'_i(d_{ki}^t) + \alpha \frac{\sum_{i\in N} C'_i(d_{ki}^t)}{\sum_{i\in N} d_{ki}^t} \left|D^t - \sum_{i\in N} d_{ki}^t\right| \quad (3)$$

$$f_{cost}(k) = \sum_{t=1}^{T} f_{\text{itv\_cost}}(k, t) \quad (4)$$

$$C'_i(d_{ki}^t) = \quad (5)$$
$$\begin{cases} C_i(d_{ki}^t) & d_{ki}^t \notin z_{il}(l=1,2,\ldots,Z_i) \\ p(d_{ki}^t, z_{ir})C_i(d_{ki}^t) & d_{ki}^t \in z_{ir} = (z_{ir\_low}, z_{ir\_up})(r \in \{1,2,\ldots,Z_i\}) \end{cases}$$

$$p(d_{ki}^t, z_{ir}) = \begin{cases} 1 + \dfrac{d_{ki}^t - z_{ir\_low}}{0.5(z_{ir\_up} - z_{ir\_low})}\beta & d_{ki}^t \leq (z_{ir\_low} + z_{ir\_up})/2 \\ 1 + \dfrac{z_{ir\_up} - d_{ki}^t}{0.5(z_{ir\_up} - z_{ir\_low})}\beta & d_{ki}^t > (z_{ir\_low} + z_{ir\_up})/2 \end{cases} \quad (6)$$

wherein $\alpha>0$ is the penalty factor when the solution violates the constraint a(load equality), and $p(\cdot)$ is the penalty function for the violation of the constraint e (POZs in a weaker form). The factor $p(\cdot)$ increases the penalty value as the load dispatched approaches the center of a POZ. The values of $\alpha$ and $\beta$ in $p(\cdot)$ should be determined by the user according to the need of each particular situation. It is worth noting that unlike the traditional methods based on genetic algorithms, containing penalty factors in the fitness function is not the only method used by the CGA to keep all solutions within or close to the feasible region.

Figure 5:
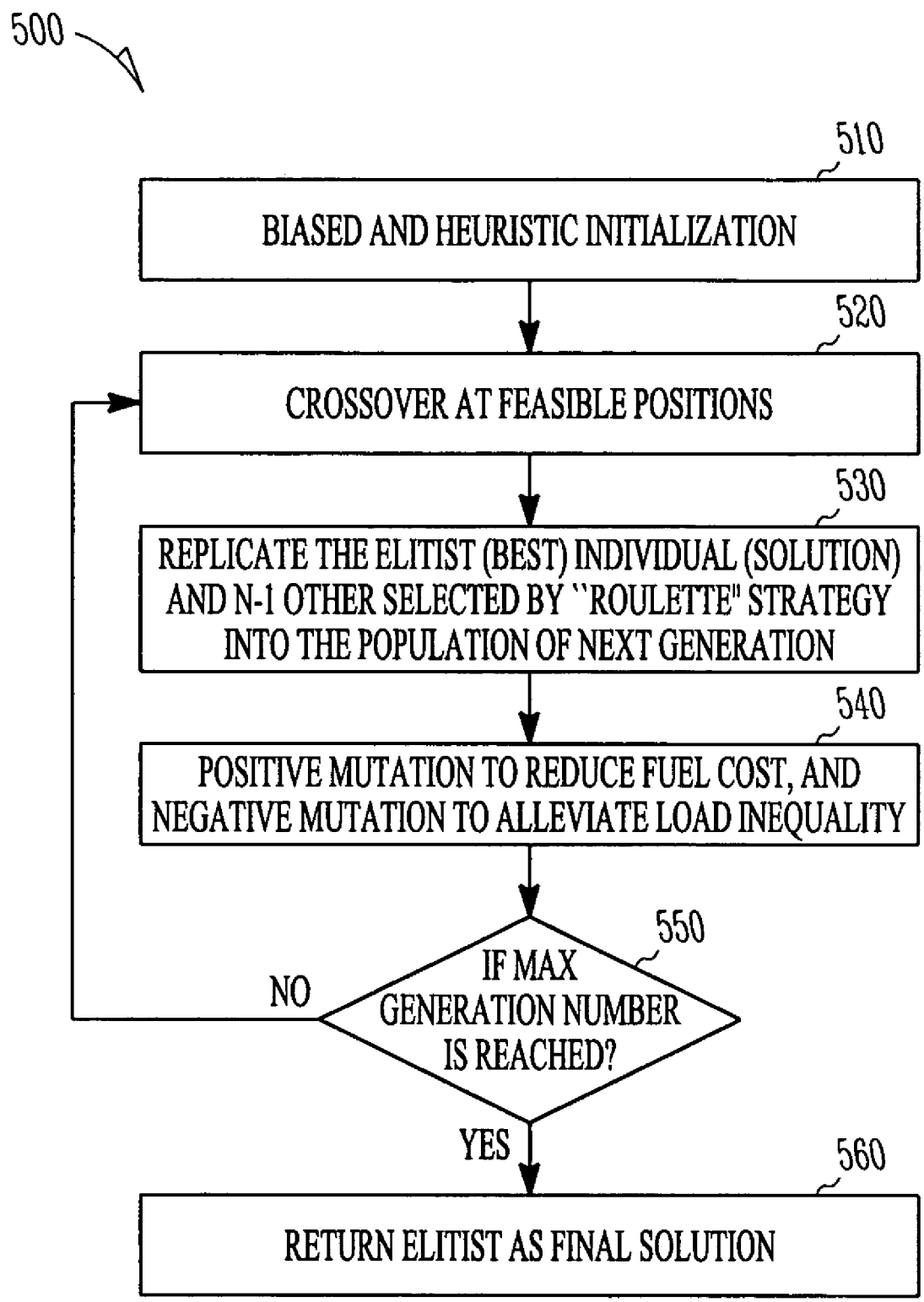
FIG. 5 illustrates an example embodiment of a process to allocate output among power generating units using a constrained genetic algorithm.

An example embodiment of a CGA 500 is illustrated in FIG. 5. In FIG. 5, at 510, the population is put through a bias and heuristic initialization. At 520, the crossover operator is applied to the $P_c\times N$ ($P_c$ is the crossover probability) pairs of individuals or "parents" selected from the population according to the genetic algorithm "Roulette" strategy. At 530, a replication keeps an individual with the highest fitness, and the rest of the N−1 individuals are selected from the population according to the "Roulette" strategy and placed into the next generation. At 540, a mutation operator is applied to the $P_m\times N$ ($P_m$ is the mutation probability) individuals selected from the population according to the "Roulette" strategy. At 550, if the number of iterations is greater than the maximum generation number G (predetermined by the user), the evolution is halted and the process 500 exports the best individual as the final solution at 560. If the maximum number of generations has not been reached, the process branches to block 520. Although the process 500 is similar to that of a standard GA, new initialization, crossover, and mutation operators are designed in the CGA to make the optimization problem solvable.

Figure 6:
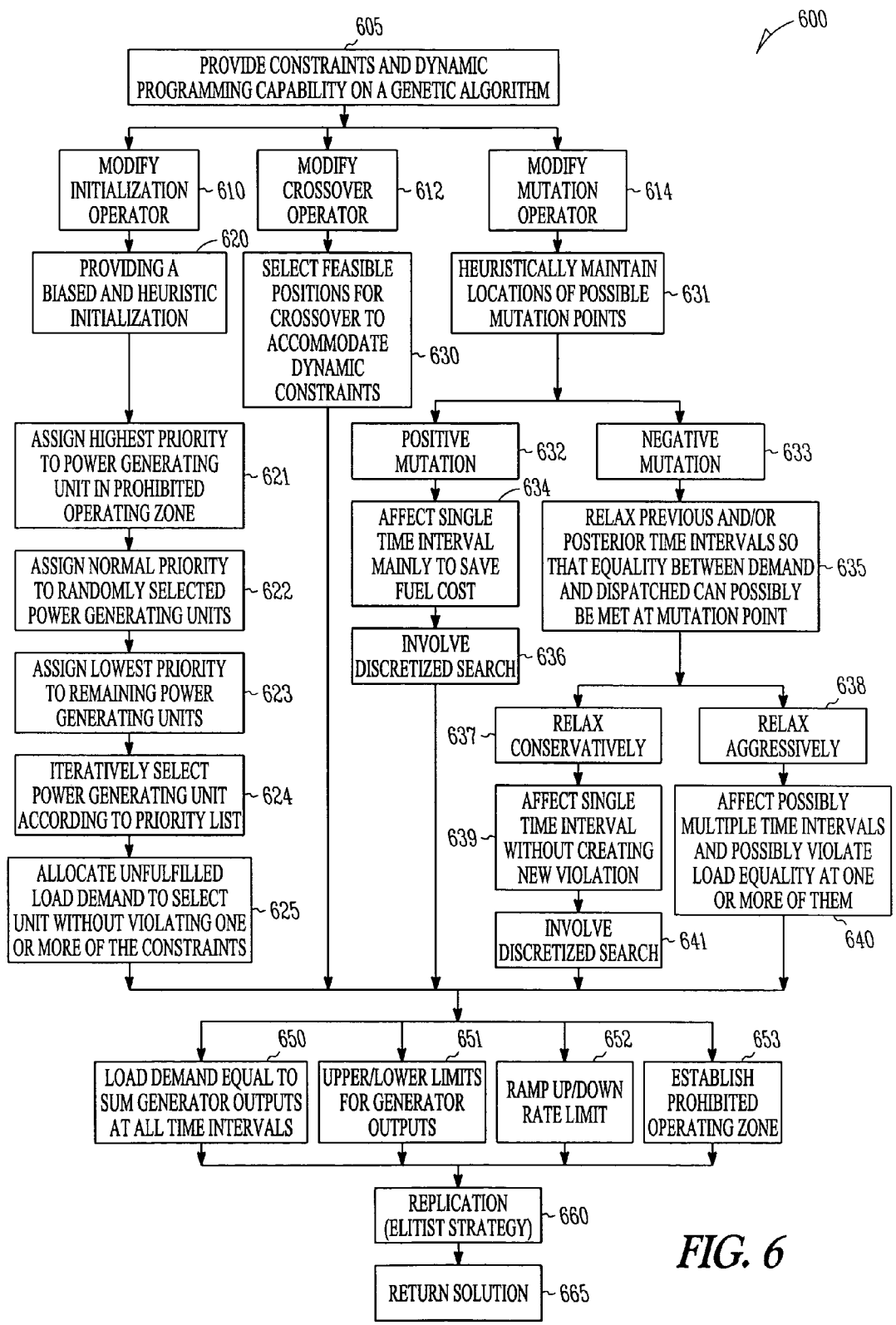
FIG. 6 illustrates another example embodiment of a process to allocate output among power generating units using a constrained genetic algorithm.

FIG. 6 illustrates another example embodiment of a CGA 600 as applied to the allocation of load demand over a finite number of time intervals among power generating units. At 605, constraints and dynamic programming capabilities are provided on the genetic algorithm. As indicated at 610, 612, and 614, modifications are made to initialization, crossover, and mutation operators. At 620, the modification to the initialization operator may include providing a biased and heuristic initialization. As outlined in 621-625, the biased and heuristic initialization of one allocation solution may include assigning a highest priority to generating units operating in a prohibited operating zone at 621, assigning a normal priority to generating units that were selected randomly at 622, assigning a lowest priority to any remaining generating units at 623, iteratively selecting a generating unit at 624 according to the priority list, and allocating unfulfilled load demand to that generating unit at 625 without violating one or more constraints.

At 630, the modification to the crossover operator may include selecting feasible positions for the crossover to accommodate dynamic constraints. The modifications to the mutation operator include heuristically maintaining locations of possible mutation points at 631, providing a positive mutation operator at 632 to reduce fuel cost at 634, and providing a negative mutation operator at 633 to relax previous and/or posterior time intervals at 635 so that equality between demand and dispatched can possibly be met at a mutation point. The positive mutation at 632 can only affect a single time interval at 634 and involve a discretized search strategy at 636 to search for a better allocation solution. For the negative mutation operator at 633, its relaxing operation at 635 consists of a conservative relaxing operator at 637 and an aggressive relaxing operator at 638. The conservative relaxing operation only affects one time interval at 639 and involves a discretized search strategy at 641 to search for a better allocation solution. The aggressive relaxing operation may affect multiple time intervals and may violate load equality at one or more time intervals at 640. At 650-653, the constraints imposed on the genetic algorithm may include one or more of a load demand equal to a sum of generator outputs, an upper and lower limit for the generating units, a limit for ramp up and ramp down rates, and the establishment of one or more prohibited operating zones. At 660, the elitist (i.e., best) solution and other ones selected by a roulette strategy are replicated to the population of the next generation. Finally, at 665, a solution is obtained upon the attaining of a maximum generation number.

Referring back to FIG. 5, in the initialization step 510, almost all the GA-based methods for ELD will initialize a new individual by randomly allocating the load demand among all generating units. However, new individuals generated in this way can result in bad starting points for evolution because most of them can seriously violate the constraints imposed here. In order to alleviate this problem, CGA initializes individuals in a biased and heuristic way. That is, for every time interval, it will iteratively select one generator according to a priority list and allocate unfulfilled load demand to it. The priority list used here assigns the highest priority to the units working in the POZs, normal priority to the preferred units selected randomly before initialization, and lowest priority to the remaining units. In order not to violate the constraints b and c, the generator selected, rather than a purely passive acceptor, can decide by itself a feasible and random portion of the load to take. Since the load equality constraint can not always be satisfied due to the dynamic constraints, the iteration is stopped after it has repeated a certain number of times. All the initialized individuals are sure to fulfill both constraints b and c.

An example of a detailed procedure of initialization is as follows:

1. Set the time interval t=0, and randomly generate E, the subset of preferred units.
2. Let $t=t+1$; $d_{ki}^t = d_{ki}^{t-1}$ (when t=1, $d_{ki}^t = P_i^0$); $\Delta D^t = D^t - D^{t-1}$ $$\left(\text{when } t = 1, \Delta D^t = D^t - \sum_{i \in N} P_i^0\right).$$

Set iteration times j=0. If $\neq D^t \neq 0$, set a variable NeedDisturbance=FALSE; otherwise $\Delta D^t = \delta$ ($\delta > 0$ is a small random value) and NeedDisturbance=TRUE.

3. Let j=j+1, and if there are units working in the POZs that have not been selected for load dispatch during this time interval, randomly select one unit from them. Otherwise, select one unit from E if j is of small value, or select one from all the N units if j is large enough. For the purposes of this example, suppose the unit selected is the ith one.
4. Choose $$\Delta d = \frac{\Delta D^t}{\lambda} (\lambda > 1)$$

is a random value), and truncate $\Delta d$ to satisfy both constraints b and c if $d_{ki}^t + \Delta d$ violates either or both of them.

5. Set $d_{ki}^t = d_{ki}^t + \Delta d$, $\Delta D^t = \Delta D^t - \Delta d$; if $j \leq J$ (J is the upper limit of iteration times) and $|\Delta D^t| > 0$, and go to step 3.

6. If NeedDisturbance=FALSE and $t \leq T$, go to step 2; if NeedDisturbance=TRUE, set j=0, $\Delta D^t = -\delta$, and NeedDisturbance=FALSE, and go to step 3. Otherwise, terminate the initialization.

When the load demand remains the same from the previous time interval ($\Delta D^t = 0$), a disturbance item $\delta$ (first set $\Delta D^t = \delta > 0$ and later set $\Delta D^t = -\delta$) is used to make steps 3 to 5 effective. This allows for the violation of constraint e to be possibly avoided.

Figure 7:
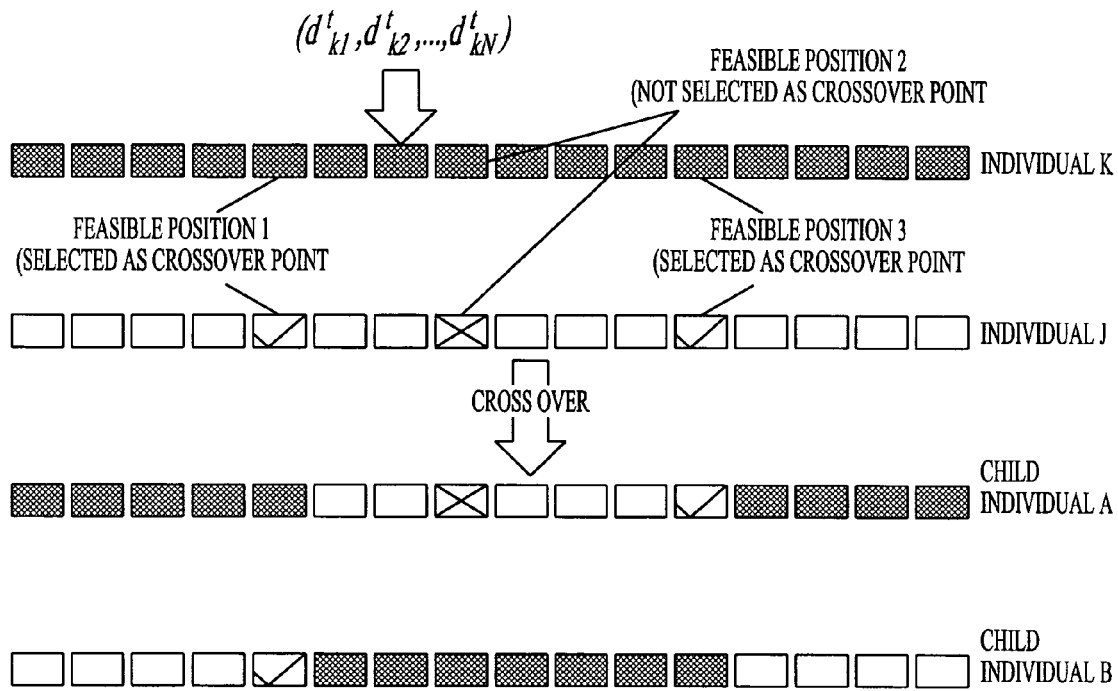
FIG. 7 illustrates an example of a crossover between two individuals.

In a traditional GA, crossover between two individuals can happen at one (single-point crossover) or several (multi-point crossover) randomly selected positions. However, to fulfill the dynamic constraints, embodiments of the present disclosure allow crossover of the CGA to happen only at feasible positions (See FIG. 7). To simplify the following description, a load dispatch for the kth individual at jth time interval is denoted as $L_k^j = (d_{k1}^j, d_{k2}^j, \ldots, d_{kN}^j)$.

Definition 1: Given a pair of individuals $f = \langle L_f^1, \ldots, L_f^{j-1}, L_f^j, L_f^{j+1}, \ldots, L_f^T \rangle$ and $m = \langle L_m^1, \ldots, L_m^{j-1}, L_m^j, L_m^{j+1}, \ldots, L_m^T \rangle$ respectively, the time interval j is a feasible position if $f' = \langle L_f^1, \ldots, L_f^{j-1}, L_f^j, L_m^{j+1} \ldots, L_m^T \rangle$ and $m' = \langle L_m^1, \ldots, L_m^{j-1}, L_m^j, L_f^{j+1} \ldots, L_f^T \rangle$ can fulfill constraint c.

The crossover operator of the CGA is defined as follows (assuming the two participants of crossover are f and m respectively):

1. Search all the feasible positions; suppose there are F of them in all; if F=0, then exit;
2. Randomly select $n \leq F$ crossover points, and divide T time intervals into at most n+1 segments. The first child individual is generated by alternately copying these segments from f and m, and the second one by alternately copying these segments from m and f;
3. Save both of the new individuals back to the population (the population will be expanded after crossover and resume its original size after replication).

As an example, assume that there are 2 feasible positions selected in step 2, which are $\{t_1, t_2\}$ and $1 < t_1 < t_2 < T$. The two feasible positions divide T time intervals into 3 segments $[1,t_1], [t_1+1,t_2], [t_2+1,T]$. Then the first child individual will be $\langle L_f^1, \ldots, L_f^{t_1}, L_m^{t_1+1}, \ldots, L_m^{t_2}, L_f^{t_2+1}, \ldots, L_f^T \rangle$ and the second one $\langle L_m^1, \ldots, L_m^{t_1}, L_f^{t_1+1}, \ldots, L_f^{t_2}, L_m^{t_2+1}, \ldots, L_m^T \rangle$.

In the following, it will be shown that new individuals generated by the crossover operation of CGA will not violate the dynamic constraint c. Since two child individuals will be generated after crossover, without loss of generality only one of them may be considered. It is first proven that no violation will occur at a connection point. Assume two successive segments selected in step 2 are $[t_{i-1}+1, t_i]$ and $[t_i+1, t_{i+1}]$ ($t_{i-1}$, $t_i, t_{i+1}$, are feasible positions selected), and $t_i$ is the connection point in this case. Then $S = L_f^{t_{i-1}+1}, \ldots, L_f^{t_i-1}, L_f^{t_i}, L_m^{t_i+1}, L_m^{t_i+2} \ldots, L_m^{t_{i+1}}$ is the section corresponding to the above segments on the new individual. The concatenation of two segments can cause violation of constraint c at two intervals near the connection point—$L_f^{t_i}$ and $L_m^{t_i+1}$. Since $t_i$ is a feasible position, according to definition 1, neither $L_f^{t_i}$ nor $L_m^{t_i+1}$ in S will violate constraint c. Since the parent individuals always fulfill constraint c at all time intervals, both constraints will always be met at intervals not affected by concatenation. As a result, the newly generated individuals will not violate constraint c.

In a traditional GA, a mutation operator will randomly choose one or several mutation points from the given individual and disturb values on these points in some way. However, these disturbances can easily cause new violations of one or multiple constraints. To avoid this, the CGA designed two types of mutation operators. The "Positive" mutation operator and the "Negative" mutation operator. When applied to a single mutation point, the former tries to reduce the fuel cost of that interval and meanwhile alleviate load inequality if constraint a is violated at that interval, while the latter only aims to meet load equality at that interval through relaxing previous and/or posterior intervals to reserve more adjustable space for that interval.

Since the new mutation operators are more time consuming than traditional ones, instead of random choosing like in the traditional GA, the CGA takes a time interval that can satisfy any one of the following criteria as a mutation point:
1) It has been modified directly during previous generations but has not been mutated;
2) It has been mutated by positive operator, and fuel cost at that interval reduced;
3) It has been mutated by negative operator, but constraint a still has not been met;
4) It is directly adjacent to a modified interval but has not been mutated.

A mutation point will be canceled if either of the following criteria can be met:
1) It has been mutated by positive operator, but fails to get reduction in fuel cost, and constraint a has been met;
2) It has been mutated by negative operator, and constraint a has been met.

During individual initialization, all time intervals will be set as mutation points, even though some of them will be canceled during evolution. However, the crossover points, the intervals involved and affected in mutation, and the intervals directly adjacent to them, can become new mutation points. The update of mutation points actually guides the optimization efforts to time intervals that need further optimization and can be further optimized.

The main objective of positive mutation is to reduce the fuel cost at the mutation point and at the same time alleviate load inequality if constraint a is violated at that interval. For example, assume the kth individual and the mutation point under consideration is the jth interval, the original load dispatch solution for this interval is $L_k^j = (d_{k1}^j, d_{k2}^j, \ldots, d_{kN}^j)$. Positive mutation at the given point happens in the following procedure:
1) Set $Q = \{1, 2, \ldots, N\}$;
2) If $Q = \phi$, terminate the search process; otherwise, randomly select one element q from Q, and let $Q = Q \setminus \{q\}$;
3) According to the constraint b and c, decide a feasible region $\alpha_q = [l_q, u_q]$ for q. If the size of the region is large enough, generate a set of m (m is a random number within (1,M], and M is the predetermined maximum search step) feasible points $F = \{s_1, s_2, \ldots, s_m\}$ so that $l_q = s_1 < s_2 < \ldots < s_m = u_q$ and $$s_p - s_{p-1} = \frac{u_q - l_q}{m-1} (p = 2, 3, \ldots m);$$

set search step i=0, $f_{min} = f_{itv\_cost}(L_k^j)$;
4) i=i+1; if i>m, return to step 2; otherwise, temporarily set $(d_{kq}^j)' = s_i$, and $(d_{kr}^j)' = d_{kr}^j (\forall r \in \{1, 2, \ldots, N\}$ and $r \neq q)$;
5) if $$\Delta D^j = D^j - \sum_{i \in N} (d_{ki}^j)' \neq 0,$$

choose units from Q to form the set of adjustable units $A = \{r | (d_{kr}^j)^{try}$ can fulfill both constraint b and c, $r \in Q$ and $$(d_{kr}^j)^{try} = (d_{kr}^j)' + \frac{\Delta D^j}{\|Q\|} \};$$

if $A \neq \phi$ then temporarily set $$(d_{kr}^j)' = d_{kr}^j + \frac{\Delta D^j}{\|A\|}, (\forall r \in A)$$

6) If the temporary solution $(L_k^j)' = ((d_{k1}^j)', (d_{k2}^j)', \ldots, (d_{kN}^j)')$ violates either of the constraints b and c, go to step 4 with all modifications discarded;
7) Calculate $f' = f_{itv\_cost}((L_k^j)')$; if $f' > f_{min}$, and directly go to step 4; otherwise update $d_{kr}^j = (d_{kr}^j)' (\forall r \in \{1, 2, \ldots, N\})$ and set $f_{min} = f'$, then go to step 4.

The steps from 3 to 6 constitute a procedure for a discretized search, in which if an increment to one unit can violate the load equality constraint, the violating part will be evenly decomposed and subtracted from other adjustable units. The adjustable unit set A is constructed in a tentative way, because $$\frac{\Delta D^j}{\|Q\|}$$

can be the true increment only when all the unit in Q can take that increment without violating constraints b and c. If some of the units in Q can not take that increment, the remaining units are going to take increment $$\frac{\Delta D^j}{\|A\|}$$

which is larger than $$\frac{\Delta D^j}{\|Q\|}$$

in absolute value. That is why the validation of $(L_k^j)'$ is rechecked in step 6. It is noteworthy that step 5 and 6 can partially or entirely reduce the load inequality if a violation of constraint a exists.

For a negative mutation, due to the dynamic constraints, if the adjustment of a load dispatch is limited to just a single time interval (no previous and/or posterior intervals are involved), it is impossible to fulfill the constraint of load equality in some cases even if it is theoretically possible. As an example, suppose the load demand rises up steeply at time interval j. Then, only if all the units can increase their power output simultaneously at j can this demand be met. However, if some of the generators have already been working at their maximum output before j, these generators can contribute nothing more at this critical time. In such a case, if the adjustment of load dispatch is limited to time interval j, the load inequality will always be there. The only solution is to change the load dispatch at previous and/or posterior time intervals, so that all units can reserve enough capacity at j to handle the challenging situation.

However, since the adjustment may involve more than one generator and more than one time interval, dynamic programming (DP) is needed to solve the problem. In order not to involve some DP algorithm that may be time consuming and inflexible in handling various constraints, the CGA again employs discretized search method, which is also employed in the positive mutation, to partially mimic the work of DP. Although it cannot guarantee the fulfillment of load equality during one running, this simple strategy is proved to be effective through evolution of the population.

Figure 8:
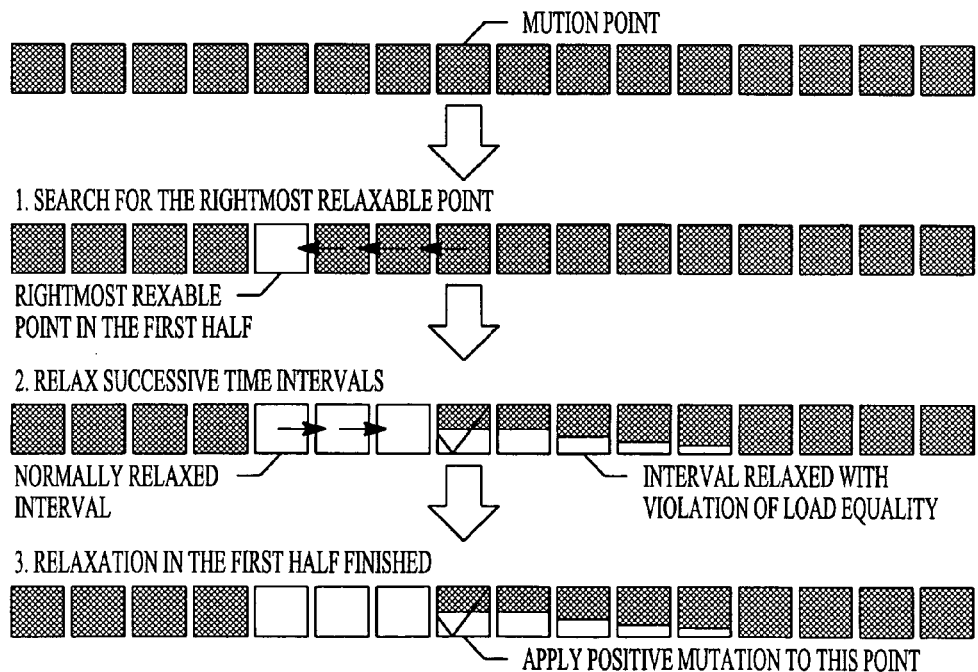
FIG. 8 illustrates an example of a negative mutation.

For example, assuming it is the kth individual, and the mutation point under consideration is the jth interval, the original load dispatch solution for this interval is $L_k^j = (d_{k1}^j, d_{k2}^j, \ldots, d_{kN}^j)$. Time interval $\{L_k^t | 1 \leq t \leq j\}$ is taken as the first half and time interval $\{L_k^t | j \leq t \leq T\}$ is taken as the second half. Negative mutation at the given point happens in the following procedure (See FIG. 8):

1) If $L_k^j$ does not violate constraint a, then exit;
2) Calculate $$\Delta D^j = D^j - \sum_{i \in N} (d_{ki}^j),$$

randomly choose the first (or the second) half, relax time intervals in the first half (whichHalf=firstHalf) or the second half (whichHalf=secondHalf));

3) If $L_k^j$ does not violate constraint a, then exit; otherwise, recalculate $\Delta D^j$ and relax time intervals in the remaining half.

It takes two steps to relax time intervals in the first (or the second) half.

I. If whichHalf=firstHalf then choose an time interval $p \in [0, j-1]$ that is closest to j and RelaxConservatively (p, $\Delta D^j$, whichHalf)=TRUE; If whichHalf=secondHalf then choose an time interval $p \in [j+1, T]$ that is closest to j and RelaxConservatively(p, $\Delta D^j$, whichHalf)=TRUE; if p does not exist, exit directly;

II. If whichHalf=firstHalf then run Relax(i, $\Delta D^j$, whichHalf) at i=p+1,p+2, . . . ,j−1 until it returns FALSE; if Relax (j−1, $\Delta D^j$, whichHalf)=TRUE, apply the positive mutation at j; If whichHalf=secondHalf then run Relax(i, $\Delta D^j$, whichHalf) at i=p−1,p−2, . . . ,j+1 until it returns FALSE; if Relax (j+1, $\Delta D^j$, whichHalf)=TRUE, apply the positive mutation at j.

The following function is employed in RelaxConservatively( ) to calculate if relaxation at some time interval is effective:

GetIntervalPotential($L_k^j$, loadDiff, whichHalf)
BEGIN
Denote $(d_{ki}^j)^*$ as any possible value for the ith unit at time interval j without violating constraints b and c $$\mu = \begin{cases} \max\left\{\Delta d | \Delta d = \sum_{i \in N} (d_{ki}^{j+1})^* - \sum_{i \in N} d_{ki}^j \right\} & \text{if } loadDiff > 0 \text{ and } whichHalf = firstHalf \\ \max\left\{\Delta d | \Delta d = \sum_{i \in N} (d_{ki}^{j-1})^* - \sum_{i \in N} d_{ki}^j \right\} & \text{if } loadDiff > 0 \text{ and } whichHalf = secondHalf \\ \max\left\{\Delta d | \Delta d = \sum_{i \in N} (d_{ki}^j) - \sum_{i \in N} (d_{ki}^{j+1})^* \right\} & \text{if } loadDiff < 0 \text{ and } whichHalf = firstHalf \\ \max\left\{\Delta d | \Delta d = \sum_{i \in N} (d_{ki}^j) - \sum_{i \in N} (d_{ki}^{j-1})^* \right\} & \text{if } loadDiff < 0 \text{ and } whichHalf = secondHalf \end{cases}$$

Return μ
END

The function RelaxConservatively(j, loadDiff, whichHalf) contains the following steps (the steps from c to f constitute a discretized search procedure which in this embodiment is identical to that used in a positive mutation):

a) Set Q={1,2, . . . ,N}, beRelaxed=FALSE;
b) If Q=ϕ, return beRelaxed and terminate the search process; otherwise, randomly select one element q from Q, and let Q=Q\{q};
c) According to the constraints b and c, decide a feasible region $\alpha_q = [l_q, u_q]$ for q. If size of the region is large enough, generate a set of m (m is a random number within (1,M), and M is the maximum search step) feasible points $F = \{s_1, s_2, \ldots, s_m\}$ so that $l_q = s_1 < s_2 < \ldots < s_m = u_q$ and $$s_p - s_{p-1} = \frac{u_q - l_q}{m - 1} (p = 2, 3, \ldots m);$$

set search step i=0; set $d_{min}$=GetIntervalPotential($L_k^j$, loadDiff, whichHalf);

d) i=i+1; if i>m, turn to step b; otherwise, temporarily set $(d_{kq}^j)' = s_i$, and $(d_{kr}^j)' = d_{kr}^j (\forall r \in \{1, 2, \ldots, N\}$ and $r \neq q)$;
e) if $$\Delta D^j = D^j - \sum_{i \in N} (d_{ki}^j)' \neq 0,$$

choose units from Q to form the set of adjustable units A={r| $(d_{kr}^j)^{try}$ can fulfill both constraint b and c, $r \in Q$ and $$(d_{kr}^j)^{try} = \left(d_{kr}^{j\,'} + \frac{\Delta D^j}{\|Q\|}\right);$$

if $A \neq \phi$ then temporarily set $$(d_{kr}^j)' = d_{kr}^j + \frac{\Delta D^j}{\|A\|}, (\forall r \in A)$$

f) If the temporary solution $(L_k^j)'=((d_{k1}^j)',(d_{k2}^j)',\ldots,(d_{kN}^j)')$ violates any of the constraints b and c, go to step d with all modifications abandoned;

g) If GetIntervalPotential( $(L_k^j)'$, loadDiff, whichHalf)> $d_{min}$, update $d_{kr}^j=(d_{kr}^j)'(\forall r \in \{1,2,\ldots,N\})$ and $d_{min}$, set beRelaxed=TRUE; finally, go to step d.

The RelaxConservatively( ) function itself still limits the adjustment of load dispatch to only one time interval, and of course it has a serious disadvantage in dealing with the situation when the relaxation involves other time intervals. This can be seen in the following example; if intervals are relaxed in the first half and $$\Delta D^j = D^j - \sum_{i \in N} (d_{ki}^j)' > 0$$

(need more load be dispatched at interval j), and now it is the p+1<jth interval under consideration; unit i is the only generator adjustable and $d_{ki}^{p+1}=d_{ki}^{p+3}, d_{ki}^{p+2}=d_{ki}^{p+1}+UR_i\cdot\Delta t=d_{ki}^{p+3}+DR_i\cdot\Delta t$ (here we suppose $UR_i=DR_i$). RelaxConservatively( ) at interval p has saved adjustable space for the interval p+1 so that $d_{ki}^{p+1}$ can be augmented to $d_{ki}^{p+1}+\Delta d$ to create additional space to augment $d_{ki}^{p+2}$ without surpassing the maximum output of unit i; since the $d_{ki}^{p+3}$ which is not modifiable for RelaxConservatively( ) at this moment sets an upper bound $d_{ki}^{p+3}+DR_i\cdot\Delta t$ for $d_{ki}^{p+2}$, adjusting $d_{ki}^{p+1}$ alone will not save augment space for $d_{ki}^{p+2}$, and hence for interval p+2, which makes RelaxConservatively( ) fail before it can affect the jth interval.

In the above example, even $d_{ki}^{p+1}$ is the right unit to be augmented to save more adjustable space for the next time interval. RelaxConservatively( ) still returns FALSE, just because it can not augment $d_{ki}^{p+3}$ simultaneously. To alleviate this problem, the function RelaxAgressivley( ) breaks the load equality of other intervals (violates constraints a) to achieve load equality of a given interval:

```
RelaxAgressively (l, loadDiff, whichHalf)//l is the time interval
BEGIN
    //Constitute C, the set of constrained units:
```

$$C = \begin{cases} \{i | d_{ki}^l \geq d_{ki}^{l+2}, d_{ki}^{l+1} < P_{i.max}, i = 1, 2, \ldots, N\} & \text{if loadDiff} > 0 \text{ and whichHalf} = \text{firstHalf} \\ \{i | d_{ki}^l \geq d_{ki}^{l-2}, d_{ki}^{l-1} < P_{i.max}, i = 1, 2, \ldots, N\} & \text{if loadDiff} > 0 \text{ and whichHalf} = \text{secondHalf} \\ \{i | d_{ki}^l \leq d_{ki}^{l+2}, d_{ki}^{l+1} > P_{i.min}, i = 1, 2, \ldots, N\} & \text{if loadDiff} < 0 \text{ and whichHalf} = \text{firstHalf} \\ \{i | d_{ki}^l \leq d_{ki}^{l-2}, d_{ki}^{l-1} > P_{i.min}, i = 1, 2, \ldots, N\} & \text{if loadDiff} < 0 \text{ and whichHalf} = \text{secondHalf} \end{cases}$$

```
While C≠φ
BEGIN
    Randomly select c∈C, set C=C|{c};
    //Decide an increment to unit c at the corresponding time interval:
```

$$\Delta d = \begin{cases} \min(P_{i.max} - d_{kc}^{l+2}, 2\cdot UR_c\cdot\Delta t, \text{loadDiff}) & \text{if loadDiff} > 0 \text{ and whichHalf} = \text{firstHalf} \\ \min(P_{i.max} - d_{kc}^{l-2}, 2\cdot UR_c\cdot\Delta t, \text{loadDiff}) & \text{if loadDiff} > 0 \text{ and whichHalf} = \text{secondHalf} \\ -1\cdot\min(d_{kc}^{l+2} - P_{i.min}, 2\cdot DR_c\cdot\Delta t, |\text{loadDiff}|) & \text{if loadDiff} < 0 \text{ and whichHalf} = \text{firstHalf} \\ -1\cdot\min(d_{kc}^{l-2} - P_{i.min}, 2\cdot DR_c\cdot\Delta t, |\text{loadDiff}|) & \text{if loadDiff} < 0 \text{ and whichHalf} = \text{secondHalf} \end{cases}$$

```
    //Add Δd to unit c at the corresponding time interval, and make modifications to
    //affected intervals so that constraints b and c can be met at all time intervals for
    //unit c.
    If whichHalf=firstHalf then
        startItv=l+2, targetItv=l+1
    else
        startItv=l-2, targetItv=l-1
    while( Δd ≠ 0 and tryTimes<a predetermined value)
    BEGIN
        If Augment(c, startItv, whichHalf, Δd)=TRUE then
        BEGIN
```

$$d_{kc}^{targetItv} = \frac{d_{kc}^l + d_{kc}^{stasrtItv}}{2}$$

```
            Update modified intervals as mutation points:
            Return TRUE;
        END
        tryTimes= tryTimes+1;
        Δd = Δd / 2 ;
    END
END
Return FALSE;
END
```

An iterative function Augment ( ) is used to make sure constraints b and c can still be met at all time intervals affected in RelaxAgressively( ). Since Augment ( ) can fail when it attempts to modify the initial load of some unit which is a fixed value to fulfill the dynamic constraints, RelaxAgressively( ), in that case, will reduce the absolute value of the increment and retry Augment ( ) until it succeeds or the retry times achieve some predetermined number.

Experiments have proven that the CGA prefers a small value of G (<100) and a large value of $P_m$ (>0.1). A large value of L can help the CGA find the optima more quickly. The maximum step number M can be around 10~50, and $\alpha$ can be set to a large value (for example 1000) so that fulfillment of constraint a will have a high priority. The maximum penalty factor $\beta$ can choose a value from about 2~10. To choose optimal and permanent settings for the method in a real appli-

```
Augment (c, itv, whichHalf, Δd)//c is the unit No.
BEGIN
    If itv<1 then
        return FALSE;//attempt to modify P_c^0, the initial load of unit c,
        which is forbidden
    orgVal = d_kc^itv
    d_kc^itv = d_kc^itv + Δd
    If itv ≥ T then
        Update interval itv as mutation point and return TRUE;
    bSucceeded=FALSE
    If whichHalf=firstHalf then
    BEGIN
        If d_kc^itv+1 ∈ [max(d_kc^itv – DR_c · Δt, P_c.min), min(d_kc^itv + UR_c · Δt, P_c.max)] then
            Update interval itv as mutation point and return TRUE;
        ELSE
```

$$\Delta d = \begin{cases} \max(d_{kc}^{itv} - DR_c \cdot \Delta t, P_{c.min}) - d_{kc}^{itv+1} & \text{if } d_{kc}^{itv+1} < \max(d_{kc}^{itv} - DR_c \cdot \Delta t, P_{c.min}) \\ \min(d_{kc}^{itv} + UR_c \cdot \Delta t, P_{c.max}) - d_{kc}^{itv+1} & \text{if } d_{kc}^{itv+1} > \min(d_{kc}^{itv} + UR_c \cdot \Delta t, P_{c.max}) \end{cases}$$

```
        bSucceeded=Augment (c, itv+1, whichHalf, Δd)
        ELSE // if whichHalf=secondHalf
            If d_kc^itv-1 ∈ [max(d_kc^itv – UR_c · Δt, P_c.min), min(d_kc^itv + DR_c · Δt, P_c.max)] then
                Update interval itv as mutation point and return TRUE;
            ELSE
```

$$\Delta d = \begin{cases} \max(d_{kc}^{itv} - UR_c \cdot \Delta t, P_{c.min}) - d_{kc}^{itv+1} & \text{if } d_{kc}^{itv-1} < \max(d_{kc}^{itv} - UR_c \cdot \Delta t, P_{c.min}) \\ \min(d_{kc}^{itv} + DR_c \cdot \Delta t, P_{c.max}) - d_{kc}^{itv+1} & \text{if } d_{kc}^{itv-1} > \min(d_{kc}^{itv} + DR_c \cdot \Delta t, P_{c.max}) \end{cases}$$

```
            bSucceeded=Augment (c, itv–1, whichHalf, Δd)
    END
    If bSucceeded=TRUE
        Update interval itv as mutation point;
    ELSE
        d_kc^itv = orgVal;// fail to update all the affected intervals, restore the
                        original value
    Return bSucceeded;
END
    The Relax( ) used in negative mutation is a combination of RelaxConservatively( )
and RelaxAgressively( ):
        Relax(itv, loadDiff, whichHalf)
        BEGIN
            If RelaxConservatively(itv, loadDiff, whichHalf)=TRUE then
                Return TRUE
            ELSE if RelaxAgressively (itv, loadDiff, whichHalf)=TRUE then
                Return TRUE
            ELSE
                Return FALSE
        END
```

For every mutation point on the individual selected for mutation, the positive operator is first applied to it. If the interval cost $f_{itv\_cost}(\bullet)$ is reduced, nothing more is done to that mutation point. Otherwise, the process continues to apply the negative operator to it only if load equality is not fulfilled at this point.

Seven parameters are used in the CGA to control its working. These parameters are the population size L, maximum generation number G, crossover probability $P_c$, mutation probability $P_m$, maximum step number M in discretized search, penalty factor $\alpha$ for violation of constraint a, and maximum penalty factor $\beta$ for violation of constraint e.

cation, a user may rerun the CGA several times beforehand with different parameter settings to dispatch a challenging load demand, and choose the optimal settings as the permanent ones according to the quality of the final solution and the running time needed.

Figure 9:
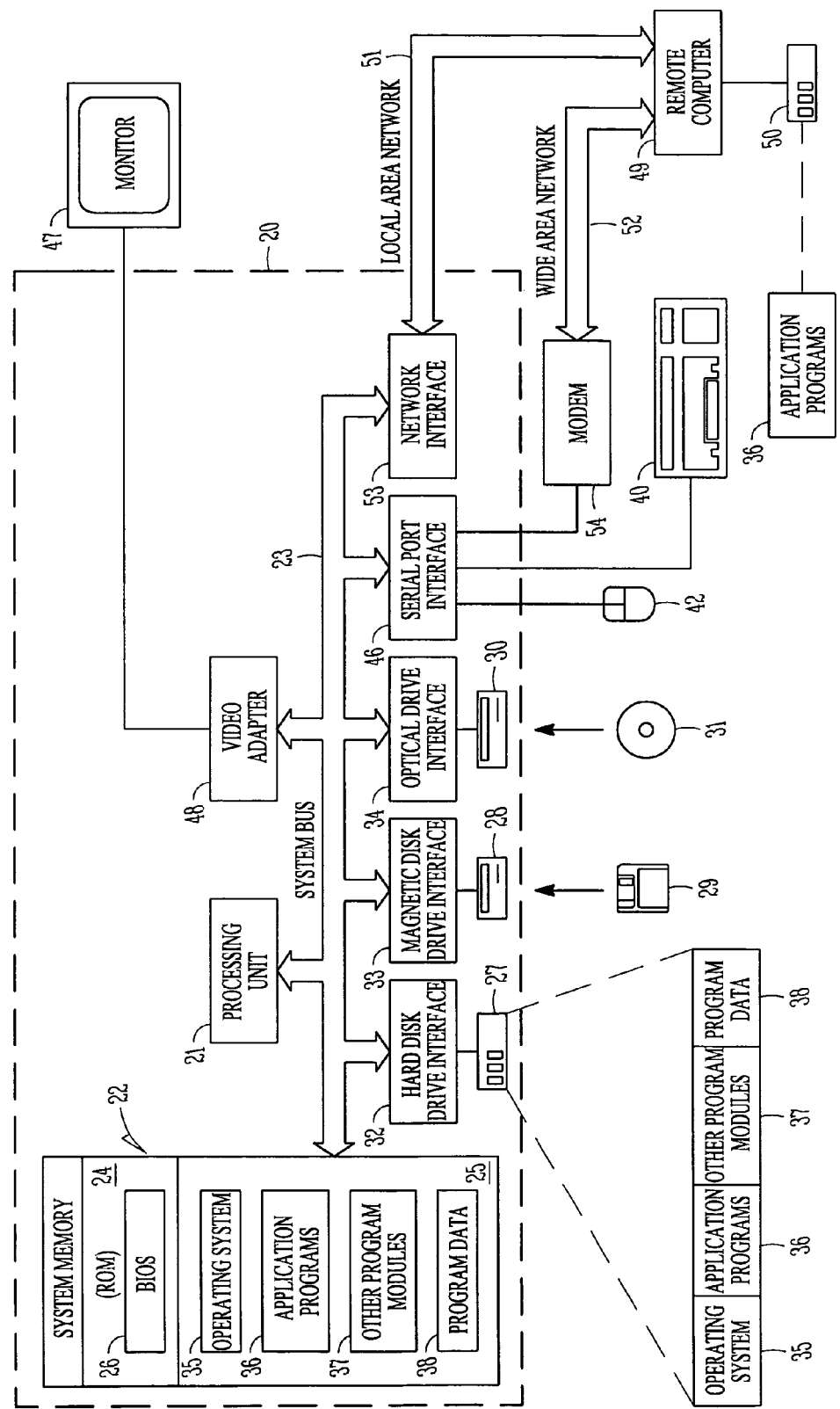
FIG. 9 illustrates an example embodiment of a computer architecture upon which one or more embodiments of the present disclosure may operate.

FIG. 9 is an overview diagram of a hardware and operating environment in conjunction with which embodiments of the invention may be practiced. The description of FIG. 9 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/0 remote processing devices that are linked through a communications network. In a distributed computing environment, program modules may be located in both local and remote memory storage devices.

In the embodiment shown in FIG. 9, a hardware and operating environment is provided that is applicable to any of the servers and/or remote clients shown in the other Figures.

As shown in FIG. 9, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 9 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

In the foregoing detailed description of embodiments, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

The invention claimed is:

1. A process comprising:
receiving at a computer processor a dynamic constraint on a genetic algorithm;
applying dynamic programming to the genetic algorithm in the computer processor such that the genetic algorithm accommodates the dynamic constraint; and
allocating load demand using the computer processor over a finite number of time intervals among a number of power generating units as a function of the constraint on the genetic algorithm and the dynamic programming of the genetic algorithm;
wherein the receiving the dynamic constraint and the applying the dynamic programming to the genetic algorithm comprises modifying one or more initialization, crossover, and mutation operators, thereby maintaining load dispatch solutions evolving freely near a feasible region; and
wherein the modifying of the mutation operator comprises heuristically maintaining locations of possible mutation points, and providing a positive mutation operator to reduce fuel cost and a negative mutation operator to achieve load equality.

2. The process of claim 1, wherein the constraint of the genetic algorithm comprises one or more of:
the load demand is equal to a sum of all outputs of the power generating units;
each power generating unit includes a lower output limit and an upper output limit;
a limit on ramp up and ramp down rates of the power generating units; and
one or more prohibited operating zones of the power generating units.

3. The process of claim 1, wherein a fuel cost function of one or more of the power generating units comprises one or more of a non-smooth characteristic and a non-convex characteristic.

4. The process of claim 1, wherein the modifying of the initialization operator comprises providing a biased and heuristic initialization to ensure a diversified initial population.

5. The process of claim 4, wherein the biased and heuristic initialization comprises:
assigning a highest priority to one or more power generating units operating in a prohibited operating zone;
assigning a normal priority to one or more power generating units selected randomly before the initialization;
assigning a lowest priority to any remaining power generating units not assigned the highest priority or the normal priority;
iteratively selecting a power generating unit according to the prioritized power generating units; and
allocating unfulfilled load demand to that power generating unit without violating the constraints on the genetic algorithm.

6. The process of claim 1, further comprising providing a discretized search strategy to one or more of the positive mutation operator and the negative mutation operator.

7. The process of claim 1, wherein the modifying of the crossover operator comprises selecting feasible positions for crossover to accommodate the constraints on the genetic algorithm.

8. A machine readable medium storing instructions, which when executed by a processor, cause the processor to perform a process comprising:
receiving a dynamic constraint on a genetic algorithm;
applying dynamic programming to the genetic algorithm such that the genetic algorithm accommodates the dynamic constraint; and
allocating load demand over a finite number of time intervals among a number of power generating units as a function of the constraint on the genetic algorithm and the dynamic programming of the genetic algorithm;
wherein the receiving a dynamic constraint and the applying dynamic programming to the genetic algorithm comprises modifying one or more initialization, crossover, and mutation operators, thereby maintaining load dispatch solutions evolving freely near a feasible region; and
wherein the modifying of the mutation operator comprises heuristically maintaining locations of possible mutation points, and providing a positive mutation operator to reduce fuel cost and a negative mutation operator to achieve load equality.

9. The machine readable medium of claim 8, wherein the constraint of the genetic algorithm comprises one or more of:
the load demand is equal to a sum of all outputs of the power generating units;
each power generating unit includes a lower output limit and an upper output limit;
a limit on ramp up and ramp down rates of the power generating units; and
one or more prohibited operating zones of the power generating units.

10. The machine readable medium of claim 8, wherein a fuel cost function of one or more of the power generating units comprises one or more of a non-smooth characteristic and a non-convex characteristic.

11. The machine readable medium of claim 8, wherein the modifying of the initialization operator comprises providing a biased and heuristic initialization to ensure a diversified initial population.

12. The machine readable medium of claim 11, wherein the biased and heuristic initialization comprises:
assigning a highest priority to one or more power generating units operating in a prohibited operating zone;
assigning a normal priority to one or more power generating units selected randomly before the initialization;
assigning a lowest priority to any remaining power generating units not assigned the highest priority or the normal priority;
iteratively selecting a power generating unit according to the prioritized power generating units; and allocating unfulfilled load demand to that power generating unit without violating the constraints on the genetic algorithm.

13. The machine readable medium of claim 8, further comprising providing a discretized search strategy to one or more of the positive mutation operator and the negative mutation operator.

14. The machine readable medium of claim 8, wherein the modifying of the crossover operator comprises selecting feasible positions for crossover to accommodate the constraints on the genetic algorithm.

15. A system comprising:
- a computer processor configured to receive a dynamic constraint on a genetic algorithm;
- a computer processor configured to apply dynamic programming to the genetic algorithm, such that the genetic algorithm accommodates the dynamic constraint; and
- a computer processor configured to allocate load demand over a finite number of time intervals among a number of power generating units as a function of the constraint on the genetic algorithm and the dynamic programming of the genetic algorithm;
- wherein the reception of a dynamic constraint and the application of dynamic programming to the genetic algorithm comprises modifying one or more initialization, crossover, and mutation operators, thereby maintaining load dispatch solutions evolving freely near a feasible region; and
- wherein the modifying of the mutation operator comprises heuristically maintaining locations of possible mutation points, and providing a positive mutation operator to reduce fuel cost and a negative mutation operator to achieve load equality.

16. The system of claim 15, wherein the constraint of the genetic algorithm comprises one or more of:
- the load demand is equal to a sum of all outputs of the power generating units;
- each power generating unit includes a lower output limit and an upper output limit;
- a limit on ramp up and ramp down rates of the power generating units; and
- one or more prohibited operating zones of the power generating units.

* * * * *